United States Patent [19]

Mitsche et al.

[11] 3,723,552
[45] Mar. 27, 1973

[54] PROCESS FOR THE ISOMERIZATION OF HYDROCARBONS

[75] Inventors: Roy T. Mitsche, Island Lake; Edward Michalko, Lombard, both of Ill.

[73] Assignee: Universal Oil Products Company, Des Plaines, Ill.

[22] Filed: Dec. 28, 1970

[21] Appl. No.: 101,675

Related U.S. Application Data

[63] Continuation-in-part of Ser. No. 20,024, March 16, 1970, Pat. No. 3,677,973.

[52] U.S. Cl.........260/668 A, 260/683.2, 260/683.65
[51] Int. Cl...............................................C07c 5/24
[58] Field of Search...........260/668 A, 683.2, 683.65

[56] References Cited

UNITED STATES PATENTS

| 3,436,174 | 4/1969 | Sand | 23/113 |
| 3,562,345 | 2/1971 | Mitsche | 260/672 |

*Primary Examiner*—Curtis R. Davis
*Attorney*—James R. Hoatson, Jr. and Robert W. Erickson

[57] ABSTRACT

A process for isomerizing isomerizable hydrocarbons using a catalytic composite comprising a zeolite with a mordenite crystal structure containing alumina fixed in combination therewith. Elimination of hydrogenation in the isomerization reaction results in a higher rate of conversion to the desired products.

11 Claims, No Drawings

PROCESS FOR THE ISOMERIZATION OF HYDROCARBONS

CROSS-REFERENCES TO RELATED APPLICATIONS

This application is a continuation-in-part of our co-pending application Ser. No. 20,024, filed Mar. 16, 1970, now U.S. Pat. No. 3,677,973, all the teachings of which co-pending application are incorporated herein by specific reference thereto.

BACKGROUND OF THE INVENTION

This invention concerns a process for isomerizing isomerizable hydrocarbon including isomerizable paraffins, cycloparaffins, olefins, and alkylaromatics. More particularly, this invention concerns a process for isomerizing isomerizable hydrocarbons utilizing a catalytic composite comprising from about 60 to about 90 wt. % of a zeolite having a mordenite crystal structure and containing alumina fixed in combination therewith, which affords substantial improvements in hydrocarbon isomerization processes.

Isomerization processes are important to the petrochemical and petroleum refining industries. For example, many uses for xylene isomers, particularly para-xylene, have created a need for processes to isomerize other xylene isomers to form the desired one. Catalysts known to prior art have been used to improve the yield of a desired isomer, but typically, these catalysts contain a hydrogenation component such as platinum or palladium. Processes utilizing such hydrogenating catalysts to isomerize xylenes generally operate at conditions which cause some hydrogenation of the aromatics to naphthenes. The naphthenes must be separated and/or recycled, which causes cracking and loss, as well as entailing expense and complicating the process. Thus, an isomerization process which avoids the use of a hydrogenation component would result in a more efficiently produced and economically desirable product.

Branched chain paraffins such as isobutane and isopentane are used as intermediates in the formation of high octane motor fuel alkylate. These isoparaffins can be produced by isomerizing the more readily available normal paraffins. It is desirable that the final alkylate produced by paraffin-olefin alkylation be highly branched in order to insure that it has a high octane rating. A high degree of branching can be attained by alkylating isobutane or isopentane with a $C_4$—$C_7$ internal olefin. The process of the present invention provides a useful method for creating the internal olefins needed for such alkylation.

Processes for isomerizing hydrocarbons are therefore of great interest to the petrochemical and refining industries, particularly when they enable the industries to produce desired substances in a more efficacious manner than heretofore possible.

Zeolites are crystalline aluminosilicates which are well known in the art of catalyzed hydrocarbon reactions. They have been used as hydrocarbon conversion and cracking catalysts. Zeolites have an ordered crystal structure which consists of cages or cavities interconnected by smaller pores and channels. The pores and channels are of definite size, and are a characteristic of each variety of zeolite. Since the dimensions of the pores and channels are such that they admit certain molecules but not others, zeolites are sometimes known as molecular sieves, and are used in various ways to take advantage of their unique selective properties. The zeolite crystal structure consists of three-dimensional networks of the fundamental units which are silicon-centered $SiO_4$ and aluminum-centered $AlO_4$ tetrahedra. These units are interconnected by sharing apical oxygen atoms. To preserve electrochemical neutrality, the $AlO_4$ tetrahedra are associated with a cation, usually sodium. For most catalytic uses of zeolites, the cation is exchanged for a hydrogen ion, giving what is called the acid form of zeolite. The fundamental tetrahedral units are arranged in geometric patterns, describable as chains, layers, or polyhedra, which are characterized by well-defined intracrystalline dimensions. The narrowest cross sections of the various pores and channels within the crystals are essentially uniform.

Mordenite is a highly siliceous zeolite, which, as naturally found or normally synthesized, has a composition in which the $SiO_4/AlO_4$ mole ratio is from about 6 to about 12. The crystal structure of mordenite consists of four and five member rings of $SiO_4$ and $AlO_4$ tetrahedra arranged to form channels or tubes running parallel to the axis of the crystal. These channels and tubes being parallel, do not intersect, so that they may be entered only at the ends of the channels. This structure is unique to mordenite among the zeolites, and the mordenite structure is often termed two-dimensional in contrast to other zeolites such as faujasite or zeolite A, in which the cages may be entered from three directions. Natural mordenite has strong acid stability because of its high silica content. Its conventional $SiO_4/AlO_4$ mole ratio of 6–12 may be increased to as much as 50 or more by acid-leaching alumina from the mordenite while preserving the characteristic mordenite crystal structure. Acid leached mordenite and caustic leached mordenite have been prepared, as well as combinations of mordenite such as a dispersion in a carrier material. These preparations have been utilized as catalysts for particular hydrocarbon reactions.

Our co-pending application, Ser. No. 20,024 discloses a novel catalyst composition comprising a zeolite having a mordenite crystal structure and containing alumina fixed in combination therewith. Mordenite having substantially the same $SiO_4/AlO_4$ mole ratio as that of the catalyst disclosed in our copending application can be prepared by prior art methods such as acid-leaching, but the mordenites disclosed in prior art do not yield the improved composition of the catalyst we have disclosed.

SUMMARY OF THE INVENTION

It is an object of this invention to provide a process for isomerizing isomerizable hydrocarbons. More specifically, it is an object of this invention to provide an isomerization process using a particular isomerization catalyst. We have developed an isomerization process utilizing the catalytic composite disclosed in our co-pending application, Ser. No. 20,024. Our co-pending application disclosed a catalyst comprising from about 60 to about 90 wt. % of a zeolite having a mordenite crystal structure and containing alumina fixed in combination therewith, which was characterized by a method of preparation.

In one embodiment, this invention relates to a process for isomerizing an isomerizable hydrocarbon which comprises contacting said hydrocarbon, at isomerization conditions, with a catalytic composite comprising from about 60 to about 90 wt. % of a zeolite having a mordenite crystal structure and containing alumina fixed in combination therewith, which catalytic composite is prepared by (1) heating an amorphous silica-alumina composite at a temperature of from about 140° to about 250° C in a closed vessel and in admixture with an aqueous alkali metal solution, said composite being characterized by a $SiO_2/Al_2O_3$ mole ratio of from about 10 to about 30, and said solution having an alkali metal concentration sufficient to provide an alkali metal/aluminum ratio of from about 1.5 to about 3.5, and forming a zeolite with a mordenite crystal structure having substantially the same $SiO_2/Al_2O_3$ mole ratio as the amorphous silica-alumina starting material, and (2) heating said zeolite in an alumina sol, thereafter separating excess sol, treating the zeolite-sol product at conditions effecting gelation of the sol, aging the resulting composition in an alkaline media for a period of at least about 5 hours and thereafter washing, drying and calcining.

In another embodiment, this invention relates to the isomerization of either saturated or olefinic isomerizable hydrocarbons by contacting one of said hydrocarbons with the aforementioned catalytic composites at isomerization conditions including a temperature of about 0° to about 400° C, a pressure of about atmospheric to about 100 atmospheres, and a liquid hourly space velocity of about 0.1 to about 10 hr.$^{-1}$, where the liquid hourly space velocity is defined as the volume of hydrocarbon per hour divided by the volume of catalyst. In a more particular embodiment, the present inventive process relates to the isomerization of an isomerizable alkylaromatic hydrocarbon by placing the alkylaromatic in contact with the aforementioned catalytic composite at isomerization conditions including a temperature of about 0° to about 600° C, a pressure of about atmospheric to about 100 atmospheres, a liquid hourly space velocity of about 0.1 to about 20 hr.$^{-1}$ and a hydrogen to hydrocarbon mole ratio of about 1:1 to about 10:1.

DESCRIPTION OF PREFERRED EMBODIMENTS

The process of this invention is applicable to isomerizable hydrocarbons including acyclic paraffins and cyclic napthenes. It is applicable to straight or mildly branched chain paraffins such as normal butane, normal pentane, normal hexane, normal heptane, normal octane, etc. It is also applicable to cycloparaffins such as alkylcyclopentanes and cyclohexanes, and methylcyclopentane, dimethylcyclopentane, cyclohexane, methylcyclohexane, dimethylcyclohexane, etc. The present inventive process is also applicable to mixtures of paraffins and/or naphthenes, including those derived from selective fractionation and distillation of natural gasolines and naphthenes. Examples of such mixtures of paraffins and/or naphthenes include the so-called pentane fractions, hexane fractions, and mixtures of these. This invention is not limited in its application to the enumerated saturated hydrocarbons. It is contemplated that straight or branched chain saturated hydrocarbons containing up to about 20 carbon atoms per molecule may be isomerized within the scope of the present invention.

The process of this invention may be utilized to provide olefins containing centrally located double bond isomers for use in motor fuel alkylation. It is applicable to mixtures of olefinic hydrocarbons of the same molecular weight including the 1-isomer, 2-isomer etc., capable of undergoing isomerization to olefins in which the double bond occupies a more central position within the carbon chain. Typical of olefinic hydrocarbons which may be utilized are 1-butene and 3methyl-1-butene which can be isomerized to 2-butene and 2-methyl-2-butene, respectively. The process of this invention may be utilized to shift the double bond of other olefinic hydrocarbons such as 1-pentene, 1-hexene, 2-hexene and 4-methyl-1-pentene to produce 2-pentene, 2-hexene, 3-hexene, and 4-methyl-2-pentene respectively.

This invention is not limited to the above listed olefinic hydrocarbons which are intended as examples rather than restrictions. Nor is the scope of this invention limited to isomerization processes wherein the olefinic bond is relocated. The scope of this process also includes isomerization wherein the skeletal arrangement of the hydrocarbons is changed, for example, the isomerization of 1-pentene to 3-methyl-1-butene, or 2-methyl-2-butene, or a combination thereof. The process of this invention is also applicable to the hydroisomerization of olefins in which olefins are converted to branched paraffins or branched olefins or a combination thereof.

The process of this invention may be utilized to isomerize isomerizable alkylaromatic hydrocarbons such as ortho-xylene, meta-xylene, paraxylene, the trimethyl benzenes, the diethylbenzenes, the triethylbenzenes, etc., and mixtures thereof. The alkylaromatics preferred for isomerization in this process are the monocyclic alkylaromatics, particularly the xylenes and mixtures thereof. Also preferred are higher molecular weight alkylaromatics such as the alkylnaphthalenes, alkylanthracenes, alkylphenanthrencences, etc. The present inventive process does not apply to the isomerization of ethylbenzene to the xylenes and similar hydrogenation reactions. The above listed isomerizable hydrocarbons may be derived from fractions of petroleum refinery streams either as pure compounds, or as certain boiling range fractions obtained by selective fractionation and distillation. The process of this invention may be utilized to isomerize isomerizable hydrocarbons when they are present in dilute concentration in liquid or gaseous streams. For example, isomerizable hydrocarbons appear in dilute concentrations in various petroleum refinery streams diluted with gases such as hydrogen, nitrogen, methane, ethane, propane, etc.

In the manufacture of the catalyst used in the process of this invention, the zeolite component is initially prepared to have a $SiO_2/Al_2O_3$ mole ratio of from about 12 to about 30, and preferably from about 15 to about 25. This is in contrast to conventional mordenite, either naturally occurring or synthetically prepared, which commonly has a $SiO_2/Al_2O_3$ mole ratio range of about 6 to about 12. The zeolite employed in the present inventive process is initially prepared to have the desired $SiO_2/Al_2O_3$ mole ratio by employing an amorphous silica-alumina composite as a starting material. The amorphous silicaalumina composite has substantially the $SiO_2/Al_2O_3$ mole ratio desired in the product. One source of amorphous silica-alumina is amorphous cracking catalyst of less than about 13 wt. % alumina. This catalyst is typically manufactured in several steps, one of which is the formation of an acidic silica sol by acidification of an aqueous sodium solution (water glass). It has been observed that the use of silica-alumina, in which the silica has been derived from an acidic silica sol, gives an improved rate of reaction in the formation of the zeolite utilized in the present process.

Other steps in the manufacture of the cracking catalyst include gelation of the silica sol, subsequent adjustment of the pH of the resulting slurry to about 3.5 and impregnation with an aluminum salt using an aqueous aluminum sulfate solution. The aluminum sulfate is thereafter hydrolyzed and precipitated. The silica-alumina product from the above steps is commonly slurried with water and spray-dried to yield fine silica-alumina microspheres suitable as a starting material in the manufacture of the zeolite component of the catalyst used in the process of this invention.

The use of an amorphous silica-alumina composite wherein the silica is derived from an acidic silica sol is preferred. But an amorphous silica-alumina composite wherein the silica is derived from a basic silica sol may also be utilized to produce the catalyst used in the present invention. For example, silica-alumina cogels are often prepared by admixing an aqueous sodium silicate solution or sol with an acidic aluminum sulfate solution to form a sol blend with a pH in excess of about 7. The blend is substantially immediately dispersed as droplets in a hot oil bath, aged therein at elevated temperature, water-washed, dried and calcined.

Regardless of the origin of the amorphous silica-alumina starting material, the silica-alumina composite is heated in admixture with an aqueous alkali metal solution at a temperature of from about 140° to about 250° C. in a closed vessel. The alkali metal solution has an alkali metal concentration sufficient to provide an alkali metal/aluminum weight ratio of from about 1.5 to about 3.5 in the reaction mixture. The alkali metal is usually sodium and the alkali metal solution is suitably an aqueous sodium hydroxide solution. Zeolite yields of 90-100 percent may be obtained after the stirred reaction mixture has been heated for a period of from about 8 to about 24 hours. The zeolite thus prepared has a $SiO_2/Al_2O_3$ mole ratio substantially the same as the amorphous silica-alumina starting materials. While this zeolite may be converted to the hydrogen form by conventional ion-exchange techniques prior to treating with the alumina sol, no particular improvement results therefrom and the zeolite may be utilized in the sodium form.

The catalyst used in the process of the present invention is a zeolite having a mordenite crystal structure and containing alumina fixed in physical and/or chemical combination therewith. This is in contrast to the conventional practice of suspending the zeolite in a refractory oxide. Our catalyst does not presume the presence of any substantial amount of extraneous alumina in its composition.

The catalyst used in the preferred embodiment of the process of the present invention is prepared using an amorphous silica-alumina, characterized by a $SiO_2/Al_2O_3$ mole ratio of 20.0 as a starting material. The amorphous material prepared by the acidification of 23.6 liters of 6.9 percent aqueous water glass solution with 2.99 liters of 25 percent sulfuric acid, the final pH being about 4.3. Gelation occurs in about 10 minutes, and 175 cc. of a 15 percent aqueous ammonia solution is added to the resulting slurry to adjust the pH to about 7.7, the temperature being maintained at about 35° C. After about one hour, 200 cc. of 25 percent sulfuric acid is added, lowering the pH to 6.5. A pre-neutralized aluminum sulfate solution, prepared by blending 700 cc. of a 28 percent aqueous ammonia solution with 2,800 cc. of an aqueous aluminum sulfate solution (comprising the equivalent of 6.7 wt. % $Al_2O_3$), is added to the aqueous silica slurry with stirring, the pH being further lowered to about 3.9. Hydrolysis of the aluminum sulfate is effected at a pH of about 6.5 by the addition of 810 cc. of a 15 percent aqueous ammonia solution. After one hour at said pH, the mixture is filtered, reslurried in water and spray-dried.

450 grams of the spray-dried silica-alumina microspheres (400 grams volatile free, 7.83 wt. % $Al_2O_3$) is admixed with 57.0 grams of sodium hydroxide in aqueous solution (1500 cc.) and sealed in an autoclave. The autoclave is rotated and heated to a temperature of 200° C. over a two hour period and further rotated and heated at 200° C. for 12 hours. The reaction mixture is cooled and filtered to recover the solids product. The product is washed and dried in the described manner.

About 150 grams of said product is heated in about 700 cc. of an aluminum chloride hydrosol using a glass vessel equipped with an overhead reflux condenser. The aluminum chloride hydrosol comprised 12.49 wt. percent alumina, 10.75 wt. percent chloride, and has a specific gravity of 1.3630. The mixture is heated for about 24 hours at reflux conditions (95°–100° C.). Thereafter, the zeolite sol product is recovered by filtration. The zeolite-sol includes about 270 cc. (86.4 grams $Al_2O_3$) of sol. The zeolite-sol is slurried with a 15 percent aqueous ammonia solution for about one hour and aged in the solution overnight at 95° C. The resulting zeolite-gel product is thereafter further washed with dilute aqueous ammonia until the filtrate is chloride-free. The product is oven-dried at 110° C., pilled and calcined. Calcination is performed in air containing 3 percent water for 1 hour at 550° C. and thereafter in dry air for 1 hour at 550° C.

It has been found that when the zeolite is admixed with alumina sol prior to being dried at a temperature not in excess of about 300° C., and preferably at a temperature not in excess of about 110° C, so that it retains volatile matter in excess of about 15 percent, by weight, the zeolite has an affinity for alumina not otherwise observed. This unusual affinity is evidenced by a greater capacity of the zeolite to fix alumina in physical and/or chemical combination with itself. The affinity is also evidenced by the catalytic properties of the composition as utilized in the process of the present invention.

The isomerization of the present inventive process may be embodied in a fixed-bed system, a moving-bed system, a fluid-bed system, or a batch operation system.

A fixed-bed system, in which the charge stock is preheated to the reaction temperature and then passed into an isomerization zone containing a fixed-bed of the catalyst is preferred. The charge stock is preferably mixed with a hydrogen-rich gas prior to passage into the isomerization zone. The isomerization zone may entail one or more separate reactors, in which the reactant may be brought into contact with the catalyst bed in either upward, downward, or radial flow. The reactant may be in a liquid, mixed liquid-vapor, or vapor phase when it is brought in contact with the catalyst. The process of this invention, utilizing the catalyst prepared in the above described manner, is preferably effected in a continuous downflow fixed-bed system. One preferred method is to pass the hydrocarbon to be isomerized continuously to an isomerization zone containing the catalyst, maintaining the zone at isomerization conditions, which include a temperature in the range of about 0° to about 400° C or more, and a pressure of about one atmosphere to about 100 atmospheres. The hydrocarbon is passed, preferably admixed with hydrogen-rich gas, over the catalyst at a liquid hourly space velocity in the range of about 0.1 to about 10 per hour or more, where the liquid hourly space velocity is the volume of hydrocarbon flowing per hour divided by the volume of catalyst. Diluents such as methane, nitrogen, etc. may be mixed with the hydrocarbon. The effluent from the isomerization zone is recovered and the isomerized product is separated and recovered by conventional means. The unreacted starting material can be recycled to form a part of the feed to the isomerization zone.

A preferred embodiment of the inventive process for isomerizing an isomerizable alkylaromatic hydrocarbon is effected by passing the aromatic into a reaction zone containing the catalyst prepared in the above described manner, in a fixed catalyst bed in a downflow through the bed while maintaining the zone at proper alkylaromatic isomerization conditions including a temperature in the range of from about 0° to about 500° C or more and a pressure of about one atmosphere to about 100 atmospheres or more. The hydrocarbon is passed through the reactor, preferably in admixture with hydrogen at a liquid hourly hydrocarbon space velocity of about 0.1 to about 20 hr.$^{-1}$ or more. Inert diluents such as nitrogen, methane, etc., may be present. The reactor effluent is recovered and the isomerized product is separated from the reactor effluent by conventional means and recovered.

EXAMPLE I

Meta-xylene is charged to a continuous flow isomerization system. The system consists of a one inch inside diameter reactor containing the catalyst as prepared in the above-described manner in a fixed-bed. The meta-xylene is mixed with hydrogen at any convenient mole ratio, heated to a temperature of about 350° C and passed into the reactor, which is maintained at a temperature of about 350° C and about 25 atmospheres of pressure. A large fraction of the charged meta-xylene is isomerized to para-xylene, without noticeable cracking or naphthene production.

EXAMPLE II

The catalyst prepared as described above is placed in a continuous flow isomerization system consisting of a one inch inside diameter reactor. The catalyst is placed therein as a fixed bed. The hydrocarbon stock, containing 15 percent para-xylene, 60 percent meta-xylene and 25 percent ortho-xylene, by weight, is mixed with hydrogen gas and continuously charged to the isomerization system at a liquid hourly space velocity of 4.0. The reactor is maintained at a pressure of about 35 atmospheres and a temperature of about 400° C. The effluent from the reactor is analyzed and found to show essentially equilibirium conversion to para-xylene with essentially no hydrogenated or cracked products.

EXAMPLE III

The catalyst prepared as described above is placed, as a fixed-bed, in a continuous flow isomerization system, essentially similar to that described in Example II. Normal pentane is charged to the system continuously, mixed with hydrogen gas, heated to about 200° C, and passed into the isomerization zone, which is maintained at a temperature of about 200° C and a pressure of about 30 atmospheres. The effluent from the isomerization zone is analyzed and it is found that a large fraction of the charged normal pentane has been isomerized to 2-methylbutane.

We claim as our invention:

1. A process for isomerizing an isomerizable hydrocarbon which comprises contacting said hydrocarbon, under isomerization conditions, with a catalyst characterized by the method of preparation which comprises:
    a. heating an amorphous silica-alumina composite at a temperature of from about 140° to about 250° C in a sealed vessel and in admixture with an aqueous alkali metal solution, said composite being characterized by a $SiO_2/Al_2O_3$ mole ratio of from about 10 to about 30 and said solution having an alkali metal concentration sufficient to provide an alkali metal/aluminum ratio of from about 1.5 to about 3.5, forming a zeolite with a mordenite crystal structure and of substantially the same $SiO_2/Al_2O_3$ mole ratio as the amorphous silica-alumina starting material;
    b. heating said zeolite in an alumina sol, thereafter separating excess sol, treating the zeolite-sol product at conditions effecting gelation of the sol, aging the resulting composition in an alkaline medium for at least about 5 hours and thereafter washing, drying and calcining.

2. The process of claim 1 further characterized with respect to step (a) of said method of preparation in that said amorphous silica-alumina composite is characterized by a $SiO_2/Al_2O_3$ mole ratio of from about 12 to about 25 and said alkaline metal solution is an aqueous sodium hydroxide solution.

3. The process of claim 1 further characterized with respect to step (b) of said method of preparation in that said zeolite is heated in said alumina sol at a temperature of from about 75° to about 125° C for a period of from about 20 to about 100 hours, said alumina sol being an aluminum chloride sol, said zeolite sol product is aged for a period of from about 10 to about 24 hours in an aqueous ammonia solution at a temperature of from about 75° to about 100° C, said composition is calcined in air containing from about 1 to about 5 wt. % water at a temperature of from about 400° to about 600° C, and thereafter in a substantially dry air atmosphere at a temperature of from about 400° to about 600° C.

4. The process of claim 1 further characterized in that said isomerizable hydrocarbon is a saturated hydrocarbon and said isomerization conditions include a temperature of about 0° to about 400° C, and a pressure of about atmospheric to about 100 atmospheres.

5. The process of claim 4 further characterized in that said hydrocarbon is a paraffinic hydrocarbon.

6. The process of claim 5 further characterized in that said hydrocarbon is a $C_4$—$C_9$ alkane.

7. The process of claim 1 further characterized in that said hydrocarbon is an olefinic hydrocarbon and said isomerization conditions include a temperature of from about 0° to about 400° C and a pressure of about atmospheric to about 100 atmospheres.

8. The process of claim 7 further characterized in that said hydrocarbon is a $C_4$—$C_7$ isomerizable olefin.

9. The process of claim 1 further characterized in that said hydrocarbon is an alkylaromatic hydrocarbon and said isomerization conditions include a temperature of from about 0° to about 600° C and a pressure of from about 1 atmosphere to about 700 atmospheres.

10. The process of claim 8 further characterized in that said hydrocarbon is a $C_8$-alkylaromatic or a nonequilibrium mixture of $C_8$-alkylaromatics.

11. The process of claim 9 further characterized in that said $C_8$ alkylaromatic is a xylene isomer or a nonequilibrium mixture of xylene isomers.

* * * * *